United States Patent
Park et al.

(10) Patent No.: US 10,819,463 B2
(45) Date of Patent: Oct. 27, 2020

(54) WIRELESS COMMUNICATION WITH MODULATION AND DEMODULATION SET BASED ON CHANNEL INFORMATION

(71) Applicant: SAMSUNG ELECTRONICS CO., LTD., Suwon-si, Gyeonggi-Do (KR)

(72) Inventors: Kwon-yeol Park, Jeonju-si (KR); Dong-woo Kim, Daegu (KR); Jong-han Kim, Yongin-si (KR); Joon-sang Ryu, Suwon-si (KR); Sang-hyun Lee, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/655,567

(22) Filed: Oct. 17, 2019

(65) Prior Publication Data
US 2020/0127759 A1 Apr. 23, 2020

(30) Foreign Application Priority Data

Oct. 18, 2018 (KR) .................. 10-2018-0124580

(51) Int. Cl.
*H04L 1/00* (2006.01)
*H04W 12/00* (2009.01)
*H04L 5/14* (2006.01)

(52) U.S. Cl.
CPC .......... *H04L 1/0003* (2013.01); *H04L 1/0016* (2013.01); *H04L 1/0026* (2013.01);
(Continued)

(58) Field of Classification Search
CPC . H04L 5/0023; H04L 27/2647; H04L 1/0077; H04L 25/0224; H04L 25/03343;
(Continued)

(56) References Cited

U.S. PATENT DOCUMENTS

| 7,804,912 B2 | 9/2010 | Luz et al. |
| 9,130,693 B2 | 9/2015 | Reznik et al. |

(Continued)

FOREIGN PATENT DOCUMENTS

| KR | 10-1851913 | 4/2013 |
| KR | 10-1437296 | 9/2014 |

(Continued)

OTHER PUBLICATIONS

Hyadi A., et al., "An Overview of Physical Layer Security in Wireless Communication Systems With CSIT Uncertainty", King Abdullah University of Science and Technology, Institute of Electrical and Electronics Engineers (IEEE); pp. 6121-6132, 2016.

(Continued)

*Primary Examiner* — Khanh C Tran
(74) *Attorney, Agent, or Firm* — F. Chau & Associates, LLC

(57) ABSTRACT

A wireless communication with modulation and demodulation set based on channel information is disclosed. An operating method of a first wireless communication device includes: transmitting a pilot signal via a wireless channel to a second wireless communication device; receiving channel state information, estimated by and transmitted from the second wireless communication device in response to the pilot signal, the channel state information including amplitude information and phase information of a wireless channel; setting a modulation method for data transmission based on the amplitude information and the phase information of the wireless channel; generating modulated data based on the modulation method; and transmitting the modulated data via the wireless channel.

19 Claims, 12 Drawing Sheets

(52) U.S. Cl.
CPC ............ *H04L 1/0035* (2013.01); *H04L 5/143* (2013.01); *H04W 12/005* (2019.01)

(58) Field of Classification Search
CPC ... H04L 5/0051; H04L 63/061; H04L 5/0048; H04L 5/0094; H04L 5/143; H04L 1/0003; H04L 1/0016; H04L 1/0026; H04L 1/0035; H04W 12/04; H04W 12/08; H04W 16/28; H04W 24/00; H04W 52/0245; H04W 52/241; H04W 12/005
See application file for complete search history.

(56) References Cited

U.S. PATENT DOCUMENTS

| | | | |
|---|---|---|---|
| 9,413,562 B2 | 8/2016 | Lim et al. | |
| 2002/0191703 A1* | 12/2002 | Ling | H04B 7/0626 375/267 |
| 2011/0142236 A1* | 6/2011 | Nica | H04L 63/06 380/255 |
| 2012/0122407 A1* | 5/2012 | Allpress | H04B 7/0623 455/67.11 |
| 2013/0077514 A1* | 3/2013 | Dinan | H04L 5/00 370/252 |
| 2013/0326630 A1 | 12/2013 | Argon | |
| 2015/0023503 A1 | 1/2015 | Baek et al. | |
| 2017/0338956 A1 | 11/2017 | Badawy et al. | |
| 2018/0227805 A1* | 8/2018 | Jang | H04W 28/26 |
| 2019/0098497 A1* | 3/2019 | Shapira | H04L 9/0875 |
| 2019/0199415 A1* | 6/2019 | Zhu | H04B 7/0697 |

FOREIGN PATENT DOCUMENTS

| | | |
|---|---|---|
| KR | 10-1446629 | 9/2014 |
| KR | 10-2015-0111242 | 10/2015 |
| KR | 10-1645204 | 7/2016 |
| KR | 10-1726085 | 4/2017 |

OTHER PUBLICATIONS

Y. Shiu at al ., "Physical Layer Security in Wireless Networks: A Tutorial", IEEE Wireless Communications, vol. 18, Issue. 2, pp. 66-74, Apr. 2011.

* cited by examiner

WIRELESS COMMUNICATION WITH MODULATION AND DEMODULATION SET BASED ON CHANNEL INFORMATION

CROSS-REFERENCE TO RELATED APPLICATION

This application claims the benefit of Korean Patent Application No. 10-2018-0124580, filed on Oct. 18, 2018, in the Korean Intellectual Property Office, the disclosure of which is incorporated herein by reference in its entirety.

TECHNICAL FIELD

This disclosure relates generally to wireless communication devices and operating method of a wireless communication device, and more particularly, to techniques for bolstering data security in wireless communication.

DISCUSSION OF THE RELATED ART

Wireless communication networks are widely used to provide various types of communication content such as voice data, video data, packet data, and message data. Recently, the demand for data security has rapidly increased in accordance with the development of mobile services via wireless communication networks. Encryption techniques that rely on computational difficulties of code decryption have been applied to wireless communication systems. However, data security may become more vulnerable as the computational capabilities available to eavesdroppers improve.

SUMMARY

Embodiments of the inventive concept provide an operating method of a wireless communication device, in which a modulation method and a demodulation method are set based on amplitude and phase of channels.

According to an aspect of the inventive concept, there is provided an operating method of a first wireless communication device. The operating method includes: transmitting a pilot signal to a second wireless communication device via a wireless channel; receiving channel state information, estimated by and transmitted from the second wireless communication device in response to the pilot signal, the channel state information including amplitude information and phase information of the wireless channel; setting a modulation method for data transmission based on the amplitude information and the phase information of the wireless channel; generating modulated data based on the modulation method; and transmitting the modulated data via the wireless channel.

According to another aspect of the inventive concept, there is provided an operating method of a wireless communication device, the operating method including: transmitting a pilot signal via a wireless channel and obtaining channel state information including information about an amplitude of a channel and information about a phase of the wireless channel, by performing channel estimation based on channel reciprocity; forming a set including k modulation methods (k is a positive integer equal to or greater than 1) based on information about the amplitude; selecting one of the modulation methods included in the set based on the information about the phase; generating modulated data based on the selected modulation method; and transmitting the modulated data via the wireless channel.

According to another aspect of the inventive concept, there is provided an operating method of a second wireless communication device, the operating method including: receiving a pilot signal via a wireless channel and obtaining channel state information for wireless communication with a first wireless communication device based on the pilot signal; forming a set including at least one predetermined demodulation method of a plurality of predetermined demodulation methods based on amplitude information of a channel included in the channel state information; selecting one of the at least one predetermined demodulation method included in the set based on phase information of the channel included in the channel state information; and demodulating data received from the first wireless communication device based on the selected demodulation method.

According to still another aspect of the inventive concept, a first wireless communication device includes an antenna, a transceiver, and at least one processor configured to execute operations of: transmitting a pilot signal via the transceiver and the antenna to a second wireless communication device through a wireless channel; obtaining channel state information via the transceiver, estimated and transmitted by the second wireless communication device based on the pilot signal, including at least channel amplitude information; selecting a phase-based modulation method based on the channel amplitude information; and modifying a constellation used in the phase-based modulation method, based on at least one of a measured channel phase and an artificial phase generated within each of the first and second wireless communication devices.

BRIEF DESCRIPTION OF THE DRAWINGS

Embodiments of the inventive concept will be more clearly understood from the following detailed description taken in conjunction with the accompanying drawings, in which like reference characters denote like elements, operations or features, wherein.

DETAILED DESCRIPTION OF EMBODIMENTS

Hereinafter, embodiments the inventive concept will be described more fully with reference to the accompanying drawings.

Figure 1:
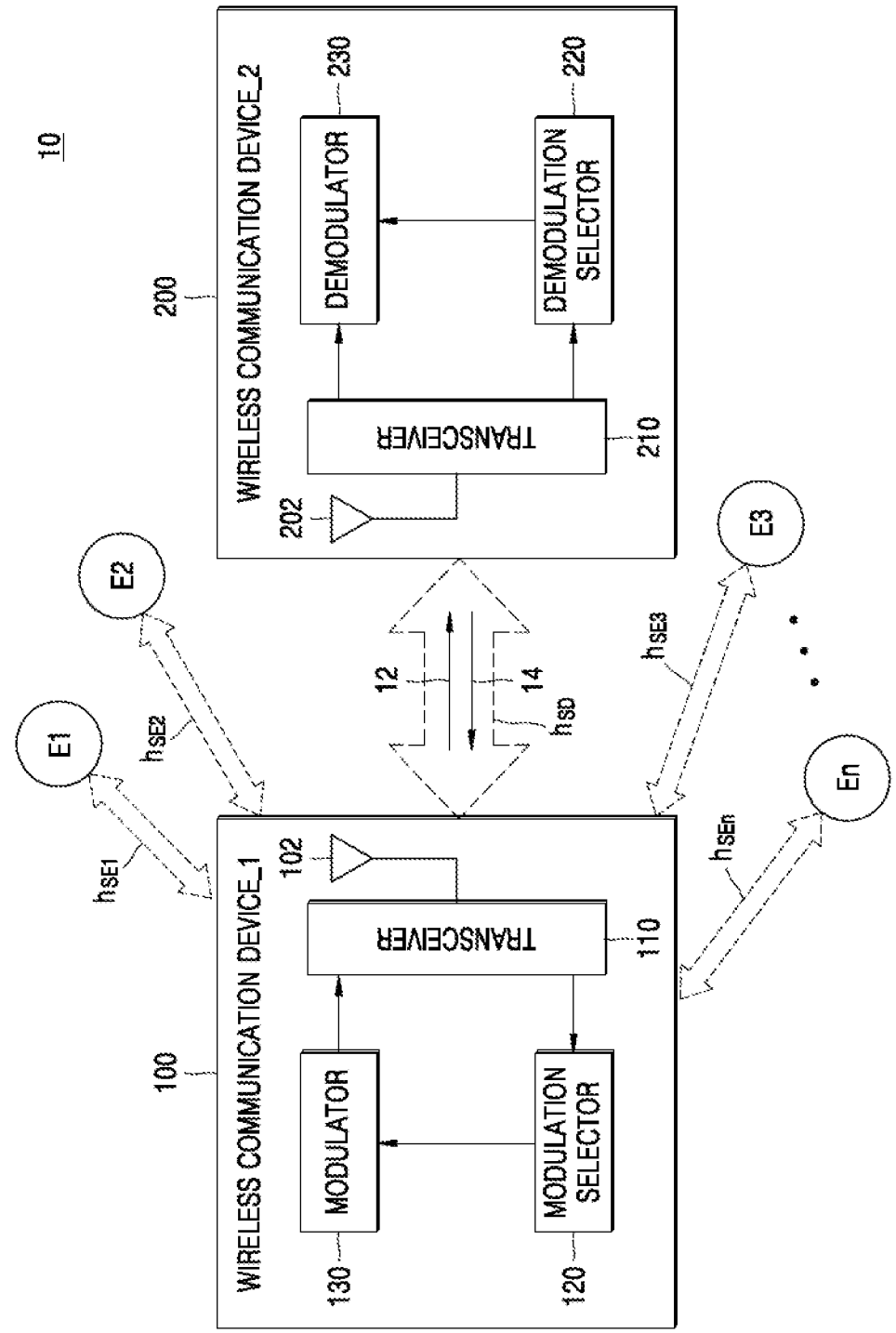
FIG. 1 is a block diagram illustrating a communication system according to an embodiment of the inventive concept.

FIG. 1 is a block diagram illustrating a communication system, 10, according to an embodiment of the inventive concept. The communication system 10 may include a first wireless communication device 100 and a second wireless communication device 200 that communicate with each other wirelessly via a channel.

The communication system 10 may be any of a variety of types of wireless communication systems. For instance, communication system 10 may be, without limitation, a wireless communication system such as a $5^{th}$ generation wireless (5G) system, a long term evolution (LTE) system, a 3G system, WiFi, and so forth. In some embodiments, the communication system 10 may be a wired communication system such as a storage system or a network system. Hereinafter, the communication system 10 will be described mainly as a wireless communication system.

Either of the first wireless communication device 100 or second wireless communication device 200 may be a base station or a component included in a base station. A base station may be a fixed station that communicates with a terminal and/or other base stations and may transmit or receive data and/or control information by communicating with a terminal and/or other base stations. A base station may also be referred to as, e.g., Node B, evolved-Node B (eNB), a Base Transceiver System (BTS), an Access Point (AP), a relay node, a Remote Radio Head (RRH), a Radio Unit (RU), or a small cell.

Either of the second wireless communication device 200 or the first wireless communication device 100 may be a terminal or a component included in a terminal. A terminal is a wireless communication device, and may be any device that transmits or receives data and/or control information by communicating another wireless communication device. For example, a terminal may be referred to as user equipment, a mobile station (MS), a mobile terminal (MT), a user terminal (UT), a subscriber station (SS), a wireless device, or a handheld device.

If the first wireless communication device 100 is embodied as a terminal or a component included in a terminal, the second wireless communication device 200 may be embodied as a base station or a component included in a base station, and vice versa. In some examples, each of the first and second wireless communication devices 100, 200 may be a terminal. Hereafter, for brevity, the first wireless communication device 100 may be interchangeably called a "first device 100" or just "device 100" and the second wireless communication device may be interchangeably called "second device 200" or just "device 200".

A wireless communication network between devices 100 and 200 may support communication of multiple users by sharing available network resources. For example, in a wireless communication network, information may be transmitted via various methods such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA).

Devices 100 and 200 may communicate with each other via a first link 12 and a second link 14. If device 100 is a terminal and device 200 is a base station, first link 12 is an uplink (UL) and second link 14 is a downlink (DL); and vice versa. In a wireless system such as an LTE system or an LTE-Advanced system, the first and second links 12, 14 may transmit control information via a control channel such as Physical Downlink Control Channel (PDCCH), Physical Control Format Indicator Channel (PCFICH), Physical Hybrid ARQ Indicator Channel (PHICH), Physical Uplink Control Channel (PUCCH), and Enhanced Physical Downlink Control Channel (EPDCCH), and may transmit data via a data channel such as Physical Downlink Shared Channel (PDSCH) and, Physical Uplink Shared Channel (PUSCH). In addition, control information may also be transmitted via an enhanced PDCCH or extended PDCCH (EPDCCH).

The first wireless communication device 100 may include an antenna 102, a transceiver 110, a modulation selector 120, and a modulator 130. The first wireless communication device 100 may transmit data via the antenna 102. Antenna 102 may be a dedicated transmission antenna ("transmit antenna") or may serve as both a transmit antenna and a reception antenna ("transceiver antenna"). For example, when the first wireless communication device 100 transmits data x(t), a reception signal $y_{S\omega}$ of the second wireless communication device 200 and n potential eavesdroppers E1 through En (n is an integer equal to or greater than 1) may be expressed as:

$$y_{S\omega}(t)=h_{S\omega}(t)x(t)+n(t), \omega=\{D, E_1, E_2, \ldots, E_n\} \quad \text{[Equation 1]}.$$

In [Equation 1], $h_{S\omega}(t)$ may indicate an effective channel gain, n(t) may indicate noise such as additive white Gaussian noise (AWGN). In addition, S may indicate the first wireless communication device 100, and D may indicate the second wireless communication device 200. In other words, $h_{SD}(t)$ may indicate an effective channel gain between the first and second devices 100, 200, and $h_{SE1}(t)$ may indicate an effective channel gain between the first wireless communication device 100 and the potential eavesdropper E1. The effective channel gain $h_{S\omega}(t)$ may be expressed by the amplitude of a channel and the channel phase as:

$$h_{S\omega}(t)=|h_{S\omega}(t)|\exp(j\theta_{S\omega}(t)) \quad \text{[Equation 2]}.$$

In an embodiment, the first wireless communication device 100 may set a modulation method based on a channel amplitude $|h_{SD}(t)|$ and a channel phase ($\theta_{SD}(t)$), and transmit modulated data generated based on the modulation method to the second wireless communication device 200. For example, the first wireless communication device 100 may obtain channel state information generated for communication with the second wireless communication device 200, and the channel state information (CSI) may include information of the channel amplitude $|h_{SD}(t)|$ and information of the channel phase $\theta_{SD}(t)$). The modulation selector 120 may form a set including a plurality of modulation methods based on the information of the channel amplitude $|h_{SD}(t)|$, and select one of the modulation methods included in the set based on the information of the channel phase $\theta_{SD}(t)$). For example, a set may be formed by adding a weight to some of the plurality of modulation methods, and one of the modulation methods included in the set may be further selected based on the weight. The modulator 130 may generate modulated data based on the modulation method selected by the modulation selector 120 and transmit modulated data to the second wireless communication device 200 via the transceiver 110 and the transmission antenna 102.

In general, the higher the order of a modulation method, the more bits represented by each transmitted symbol, and the higher the data rate. However, a higher order modulation method may not be feasible in a noisy channel, since high accuracy is required to ascertain a signal's amplitude and phase in a narrow range within each of I and Q (In-phase and Quadrature) channels, and the noise may lead to excessive bit errors. For example, if the channel amplitude $|h_{SD}(t)|$ and the channel phase $\theta_{SD}(t)$ are indicative of a noisy or weak signal channel, e.g., with a low signal/noise (s/n) ratio and an unstable phase, a higher order modulation method may be unsuitable for subsequent communications, and therefore a lower order modulation method may be selected by the modulation selector 120. On the other hand, if the channel amplitude and channel phase are indicative of a channel with a high sin ratio and a stable phase, a higher order modulation method may be selected.

According to art embodiment, once a modulation method is selected, the modulator 130 may modify a constellation for data transmission of the selected modulation method based on the information of the channel phase $\theta_{SD}(t)$. For example, the modulator 130 may modify a constellation by multiplying each of signal constellation points of a constellation by $\exp(-j\theta_{SD}(t))$ to thereby rotationally change the sectors of the constellation. Accordingly, the constellation for data transmission may be modified in a clockwise direction by the phase $\theta_{SD}(t)$. An example of a constellation modification will be explained later in connection with FIG. 7. Since an eavesdropper is likely to attempt demodulation based on a standard constellation, modifying the constellation from a standard constellation may make demodulation more difficult for the eavesdropper.

In alternative embodiments, the modulation method is selected based on just the channel amplitude $|h_{SD}(t)|$, and thereafter a constellation modification is made based on the phase $\theta_{SD}(t)$.

The second wireless communication device 200 may include an antenna 202, a transceiver 210, a demodulation selector 220, and a demodulator 230. The second wireless communication device 200 may receive data transmitted from the first wireless communication device 100 via the antenna 202. Antenna 202 may be a dedicated receive antenna, or may serve as both a receive antenna and a transmit antenna.

The second wireless communication device 200 may receive a pilot signal transmitted from the first wireless communication device 100 and estimate a channel state based on the pilot signal. The second wireless communication device 200 may obtain information about the channel amplitude $|h_{SD}(t)|$ and the channel phase $\theta_{SD}(t)$. According to an embodiment, the second wireless communication device 200 may set a demodulation method for demodulation of modulated data based on the information of the channel amplitude $|h_{SD}(t)|$ and the information of the channel phase $\theta_{SD}(t)$. For example, the demodulation selector 220 may set a set of a plurality of demodulation methods based on the information of the channel amplitude $|h_{SD}(t)|$, and select one of the demodulation methods included in the set based on the information of the channel phase $\theta_{SD}(t)$. As noted above, a lower order demodulation may be selected when the channel amplitude and channel phase are indicative of noisy channel, and a higher order demodulation may be selected when the channel amplitude and phase are indicative of a high s/n channel. The demodulator 230 may demodulate modulated data received via the reception antenna 202 and the transceiver 210 based on the demodulation method selected by the demodulation selector 220. In other words, the demodulation method selected by the demodulation selector 220 may correspond to the modulation method for modulated data generated using the first wireless communication device 100.

According to an embodiment, the demodulator 230 may modify a constellation for data demodulation based on the information of the channel phase $\theta_{SD}(t)$. For example, the demodulator 230 may modify a constellation by multiplying each of signal constellation points of the constellation by $\exp(j\theta_{SD}(t))$.

In accordance with the inventive concept, the first and second wireless communication devices 100, 200 set a modulation anal/or demodulation method for data exchange based on channel state information, thereby further increasing security strength regarding transmitted data. For example, a wireless channel experienced by the potential eavesdroppers E1 through En is different from a wireless channel between the first wireless communication device 100 and the second wireless communication device 200, and thus, the first wireless communication device 100 (or the second wireless communication device 200) may avoid attacks from the potential eavesdroppers E1 through En by data modulation based on the information of the channel amplitude $|h_{SD}(t)|$ and the information of the channel phase $\theta_{SD}(t)$. Further, the channel phase $\theta_{SD}(t)$ is akin to a random variable unknown to an eavesdropper. By rotating a constellation by an amount of the channel phase $\theta_{SD}(t)$, an eavesdropper may be unable to demodulate any intercepted data. Further, even if an eavesdropper intercepts the channel phase transmitted from the second device 200 to the first device 100, the eavesdropper may be unaware that the first and second devices 100, 200 are communicating on the basis of a constellation modification.

Figure 2:
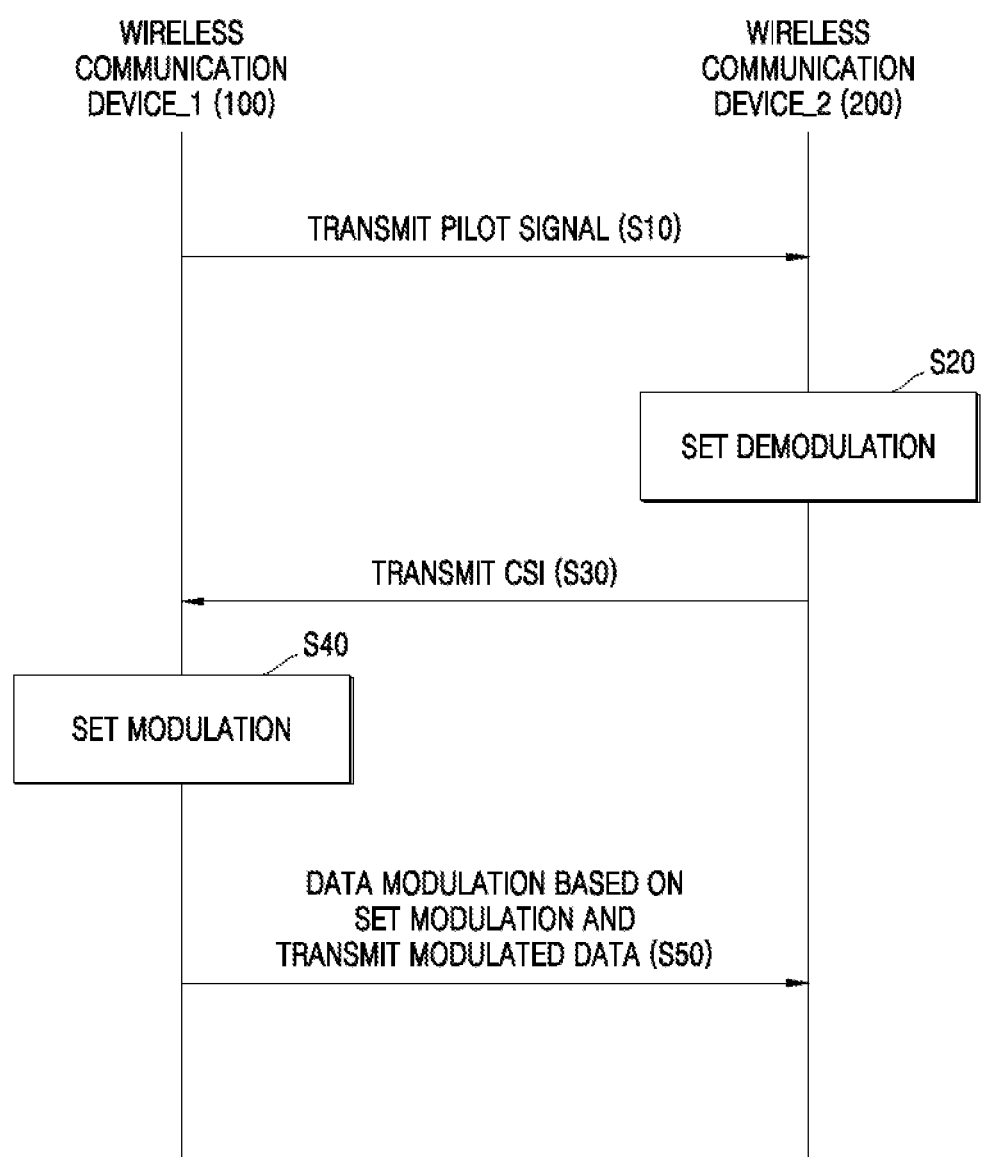
FIG. 2 is a flow diagram of an operation of a communication system according to an embodiment of the inventive concept.

FIG. 2 is a flow diagram of an operation of a communication system according to an embodiment of the inventive concept. FIG. 2 may be a flowchart of, for example, an operation of the communication system 10 of FIG. 1.

Referring to FIG. 2, the first wireless communication device 100 may transmit a pilot signal to the second wireless communication device 200 (S10). The second wireless communication device 200 may estimate a channel for wireless communication with respect to the first wireless communication device 100, based on the pilot signal, and obtain infinmation about a channel, accordingly. The information about a channel, obtained by using the second wireless communication device 200, may include information of a channel amplitude $|h_{SD}(t)|$ and information of a channel phase $\theta_{SD}(t)$. The second wireless communication device 200 may set a demodulation method for data to be received from the first wireless communication device 100 based on the information of the channel amplitude $|h_{SD}(t)|$ and the information of channel phase $\theta_{SD}(t)$ (S20).

The second wireless communication device 200 may transmit channel state information CSI to the first wireless communication device 100 based on the obtained information about the channel (S30). For example, the first wireless communication device 100 and the second wireless communication device 200 may perform wireless communication based on a frequency division duplex (FDD) method, and accordingly, the second wireless communication device 200 may feed back estimated information about the channel to the first wireless communication device 100.

According to an embodiment, the second wireless communication device 200 may transmit channel state information CSI including the information of the channel amplitude $|h_{SD}(t)|$ and the information of the channel phase $\theta_{SD}(t)$ to the first wireless communication device 100. For example, the channel state information CSI may include a channel quality indicator (CQI). The CQI may include information of a channel amplitude $|h_{SD}(t)|$ and information of a channel phase $\theta_{SD}(t)$.

The first wireless communication device 100 may set a modulation method based on the infmnation of the channel amplitude $|h_{SD}(t)|$ and the information of the channel phase $\theta_{SD}(t)$ included in the CSI (S40). For example, the first wireless communication device 100 may quantize the information of the channel amplitude $|h_{SD}(t)|$ and the information of the channel phase $\theta_{SD}(t)$ and use the quantized infbrmation in selecting a modulation method. This will be described in further detail later. The first wireless communication device 100 may modulate data based on the set modulation method and transmit the generated modulated data to the second wireless communication device 200 (S50).

Figure 3:
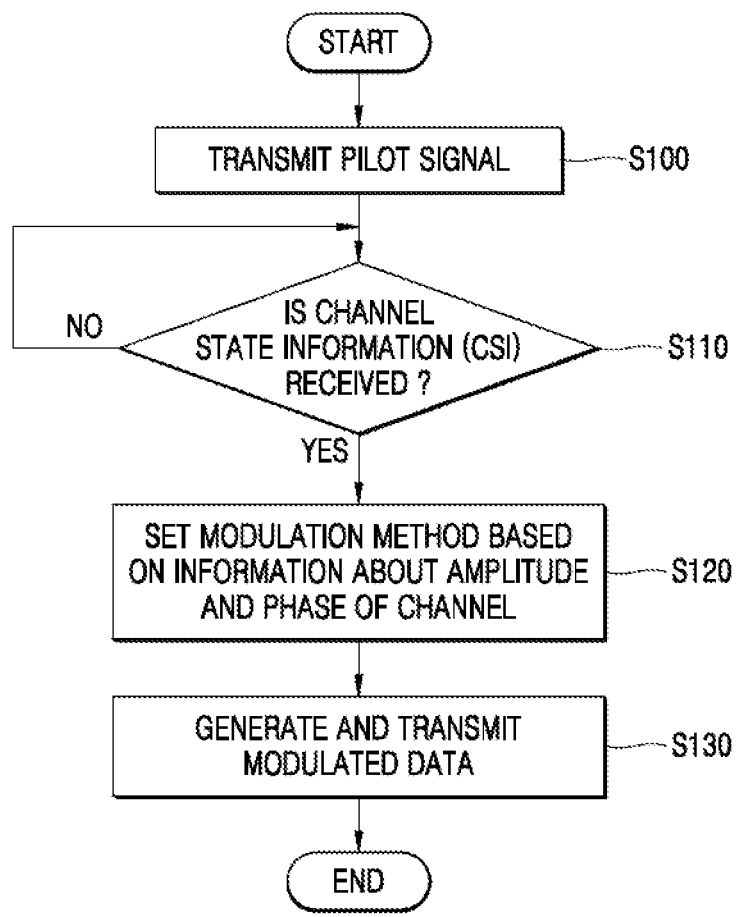
FIG. 3 is a flowchart of an operation of a first wireless communication device according to an embodiment of the inventive concept.

FIG. 3 is a flowchart of an operation of a first wireless communication device according to an embodiment of the inventive concept. For example, FIG. 3 may be a flowchart of an operation of the first wireless communication device 100 of FIG. 1.

Referring to FIG. 3, the first wireless communication device 100 may transmit a pilot signal to the second wireless communication device 200 (S100). The first wireless communication device 100 may determine whether channel state information CSI output from the second wireless communication device 200 in response to the pilot signal is received (S110), and when the channel state information CSI is received, the first wireless communication device 100 may set a modulation method based on the information of the channel amplitude $|h_{SD}(t)|$ and the information of the channel phase $\theta_{SD}(t)$ (S120). The first wireless communication device 100 may generate modulated data based on the set modulation method and transmit the modulated data to the second wireless communication device 200 (S130).

Figure 4:
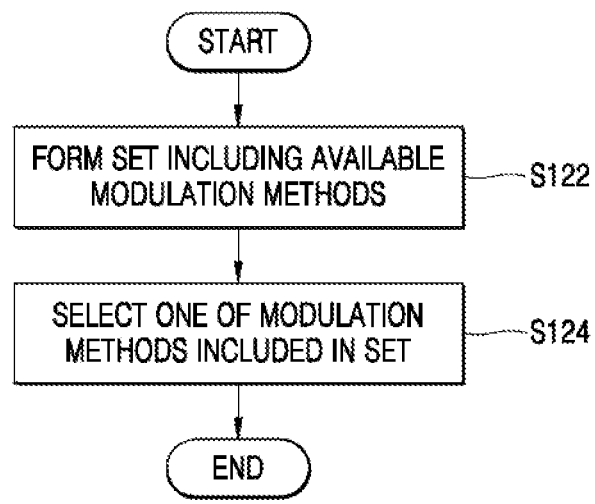
FIG. 4 is a flowchart of setting of a modulation method according to an embodiment of the inventive concept.

FIG. 4 is a flowchart of setting of a modulation method according to an embodiment of the inventive concept. For example, FIG. 4 may be an example of operation S120 of FIG. 3.

Referring to FIG. 4, the first wireless communication device 100 may form a set including modulation methods that are available to the channel amplitude $|h_{SD}(t)|$ from among a plurality of predetermined modulation methods (S122). For example, a set $M_k$ (k is a positive integer equal to or higher than 1) formed by using the first wireless communication device 100 may be expressed by:

$$M_k = \{m_1, m_2, m_3, \ldots, m_k\} \quad \text{[Equation 3]}.$$

In [Equation 3], $m_1, m_2, m_3, \ldots, m_k$ may each indicate a different respective modulation method. Alternatively, $m_1, m_2, m_3, \ldots, m_k$ may each indicate a different respective combination of a modulation method and a coding rate. For example, the modulation method may be a phase modulation method such as any n-QAM (Quaternary Amplitude Modulation) or nPSK (phase shift keying) such as BPSK, QPSK, 8 PSK, 16 PSK, 16 QAM, 64 QAM, 256 QAM, 1024 QAM, or the like, but other modulation method choices are available.

According to an embodiment, the first wireless communication device 100 may form a set that includes some modulation methods that are available in association with a channel amplitude $|h_{SD}(t)|$ based on a preset condition. For example, the first wireless communication device 100 may form a set that includes a certain number of modulation methods with respect to an upper order from among modulation methods available in association with the channel amplitude $|h_{SD}(t)|$, or form a set that includes a certain number of modulation methods with respect to a lower order from among modulation methods available in association with the channel amplitude $|h_{SD}(t)|$. Alternatively, the first wireless communication device 100 may form a set that includes modulation methods of an even-numbered order (or an odd-numbered order) from among modulation methods that are available to the channel amplitude $|h_{SD}(t)|$.

Next, the first wireless communication device 100 may select one of modulation methods included in a set $M_k$ based on information of the phase $\theta_{SD}(t)$, as a modulation method for data transmission (S124). According to an embodiment, the first wireless communication device 100 may divide a virtual circle into k regions and allocate $m_1, m_2, m_3, \ldots, m_k$ to the k regions, respectively. The first wireless communication device 100 may select a modulation method allocated to a region corresponding to the phase $\theta_{SD}(t)$ as a modulation method for data transmission.

Alternatively, the modulation method is selected based just on the amplitude $|h_{SD}(t)|$, and a constellation modification is thereafter made based just on the phase $\theta_{SD}(t)$.

Figure 5:
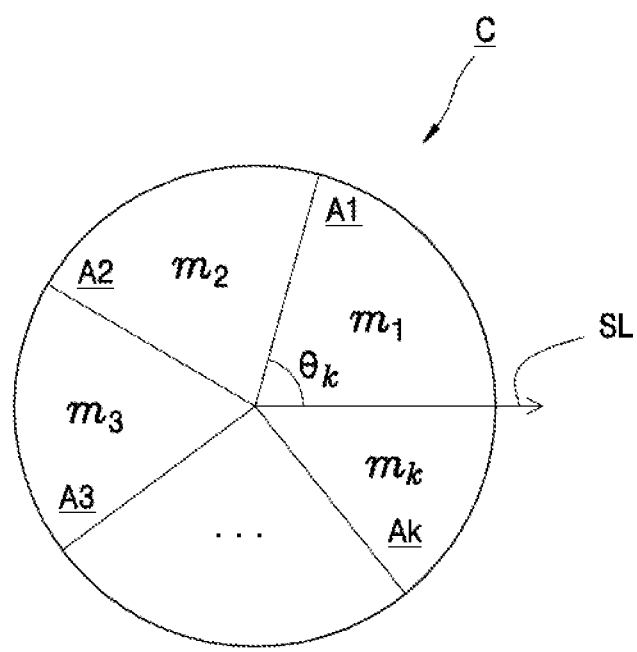
FIG. 5 illustrates a virtual circle and regions described with reference to FIG. 4.

FIG. 5 illustrates the virtual circle and the regions described with reference to FIG. 4. Referring to FIG. 5, a virtual circle C is divided into k regions A1 through Ak, and $m_1, m_2, m_3, \ldots, m_k$ may be respectively allocated to the regions A1 through Ak. While the modulation methods are allocated to the regions A1 through Ak in an ascending order, this is for convenience of description, and the allocation manner is not limited thereto. In other words, modulation methods may also be allocated to the regions A1 through Ak in a descending order, or one modulation method may be repeatedly allocated to two or more regions.

According to an embodiment, the first wireless communication device 100 may divide a virtual circle C into k regions A1 through Ak having equal areas. In other words, a central angle of each of the k regions A1 through Ak may be equal to $\theta_k$, and $\theta_k$ may be $$\theta_k = \frac{2\pi}{k}.$$

According to another embodiment, the first wireless communication device 100 may divide a virtual circle C into k regions A1 through Ak having different areas from one another. That is, at least two of the k regions A1 through Ak may be different from each other.

The first wireless communication device 100 may select one of the regions A1 through Ak based on a channel phase $\theta_{SD}(t)$. For example, the first wireless communication device 100 may select a region in which a phase $\theta_{SD}(t)$ measured from a refrence line SL is included. Accordingly, the first wireless communication device 100 may select a modulation method allocated to that region as a modulation method for data transmission. When the selected modulation method is referred to as $m_{sel}$, selection of $m_{sel}$ may be expressed as:

$$m_{sel} = m_n, \text{ if } 2(n-1)\pi/k \leq \theta_{SD} < 2n\pi/k \quad \text{[Equation 4]}.$$

In [Equation 4], n may be a positive integer in a range of $1 \leq n \leq k$.

Figure 6:
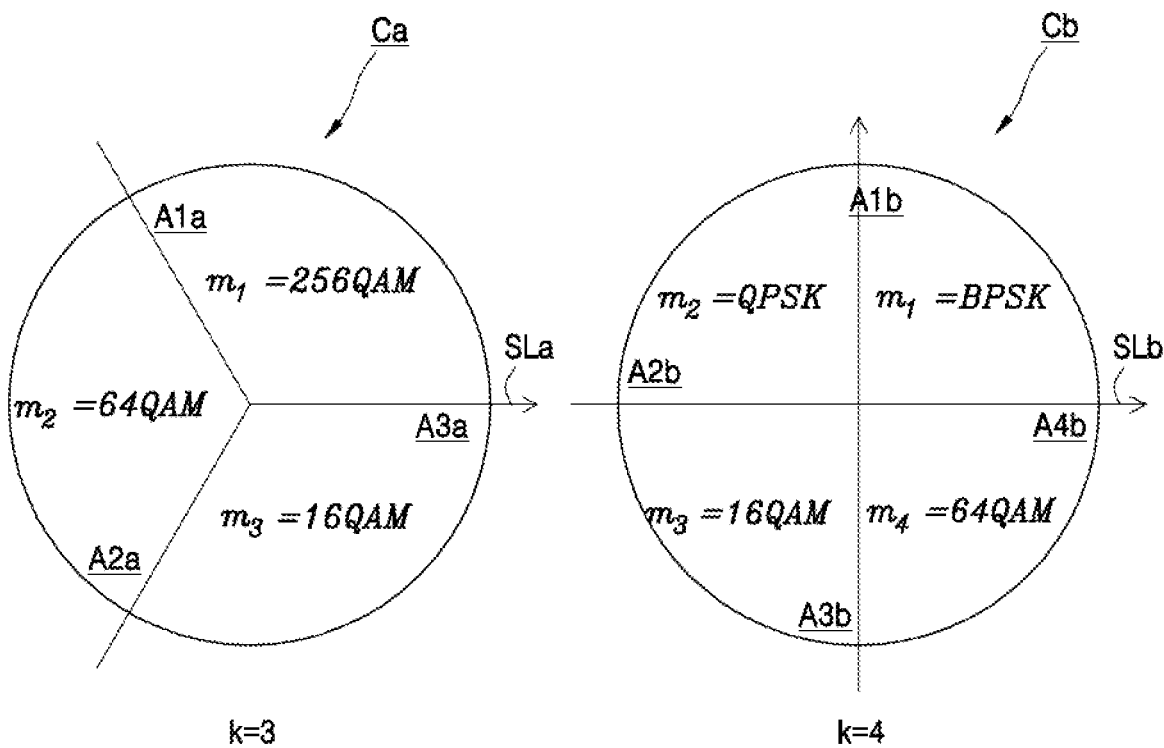
FIG. 6 is a diagram for describing division of regions with reference to different ks and allocation of modulation methods.

FIG. 6 is a diagram for describing division of regions with reference to different ks and allocation of modulation methods. As shown in FIG. 6, when k is 3, a virtual circle Ca may be divided into first through third regions A1a through A3a. In addition, a modulation method $m_1$ may be allocated to the first region A1a, a modulation method $m_2$ may be allocated to the second region A2a, and a modulation method $m_3$ may be allocated to the third area A3a. For example, $m_1$ may be a 256 QAM method, $m_2$ may be a 64 QAM method, and $m_3$ may be a 16 QAM method. In other embodiments the allocation manner may differ. For example, the modulation selector 120 of the first wireless communication device 100 may select a modulation method allocated to a region in which a phase $\theta_{SD}(t)$ measured from a reference line SLa is included, as a modulation method for data transmission.

Figure 7:
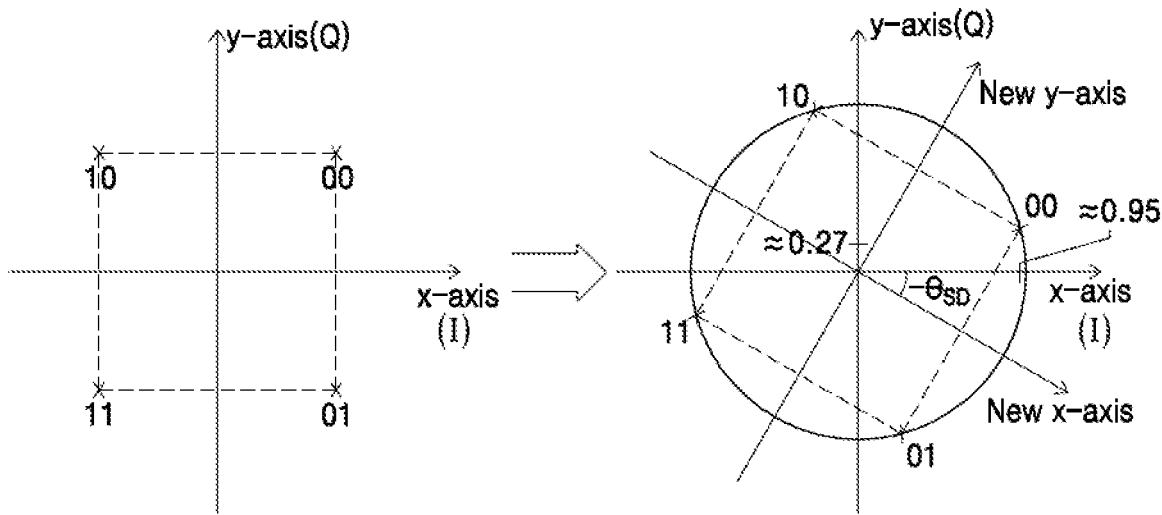
FIG. 7 is a diagram for describing modification of a constellation according to an embodiment of the inventive concept.

When k is 4, a virtual circle Cb may be divided into first through fourth regions A1b through A4b. In addition, a modulation method $m_1$ may be allocated to the first region A1b, a modulation method $m_2$ may be allocated to the second region A2b, and a modulation method $m_3$ may be allocated to the third area A3b, and a modulation method $m_44$ may be allocated to the fourth area A4b. However, this is an embodiment, and the allocation manner is not limited thereto. For example, the modulation selector 120 of the first wireless communication device 100 may select a modulation method allocated to a reaion in which a phase $\theta_{SD}(t)$ measured from a reference line SLb is included, as a modulation method for data transmission, FIG. 7 is a diagram for describing modification of a constellation according to an embodiment of the inventive concept. FIG. 7 illustrates, for example, a constellation of a QPSK method. Hereinafter, the description will be based on a QPSK method for convenience of description, but the inventive concept is not limited thereto. Hereinafter, the description of the embodiment of FIG. 7 will be provided with reference to FIG. 1. The constellation modification exemplified in FIG. 7 is applicable on both the modulation and demodulation sides of the communication between devices 100 and 200.

Referring to FIG. 7, the x-axis denotes a real number axis, and the y-axis denotes an imaginary number axis, and signal constellation points may be respectively marked on quadrants partitioned along the x-axis and the y-axis. For example, symbols transmitted from the first wireless communication device 100 may be respectively modulated by being mapped to one of the signal constellation points. In a QPSK method, each signal constellation point may have 2 bit-information, and a modulated signal may be represented by a combination of an I (In-phase) component along the x-axis and a Q (quadrature-phase) component along the y-axis. For example, a signal constellation point of a first quadrant may have information of '00'; a signal constellation point of a second quadrant may have information of '10'; a signal constellation point of a third quadrant may have information of '11'; and a signal constellation point of a fourth quadrant may have information of '01'. A circle of the constellation may have a radius of 1.0 measured from the origin. Thus, in a standard QPSK modulation method as seen on the left hand side of FIG. 7, '00' may correspond to I=0.717 and Q-0.717; '10' may correspond to I=−0.717 and Q=0.717; '11' may correspond to I=−0.717 Q=−0.717; and '01' may correspond to I=0.717 and Q=−0.717.

According to an embodiment, the first wireless communication device 100 may modify a constellation based on a channel phase $\theta_{SD}(t)$. For example, the modulator 130 of the first wireless communication device 100 may modify a constellation by multiplying each constellation point by $\exp^{-j\theta_{SD}}$. By multiplying $\exp^{-j\theta_{SD}}$, the x-axis and the y-axis and the signal constellation points of the constellation may be rotated clockwise by the phase $\theta_{SD}(t)$. The modulator 130 may generate modulated data based on the modified constellation and transmit the modulated data to the second wireless communication device 200. For instance, as shown on the right hand side of FIG. 7, the constellation has effectively rotated clockwise by the angle $\phi_{SD}$, so that a symbol representation of '00' will be made by a combination of I~0.95 and Q~0.27, and the symbol representations of the other codes are similarly changed. Since an eavesdropper is likely to be unaware of any such constellation rotation, data security is enhanced.

According to another embodiment, the modulator 130 may modify a constellation by multiplying each signal constellation point of the constellation by $\exp^{-j\alpha\phi_{SD}}$. In other words, by further multiplying the channel phase $\theta_{SD}(t)$ by a weight ($\alpha$), the x-axis, the y-axis, and the signal constellation points of the constellation may be rotated clockwise by $\alpha\theta_{SD}(t)$.

Figure 8:
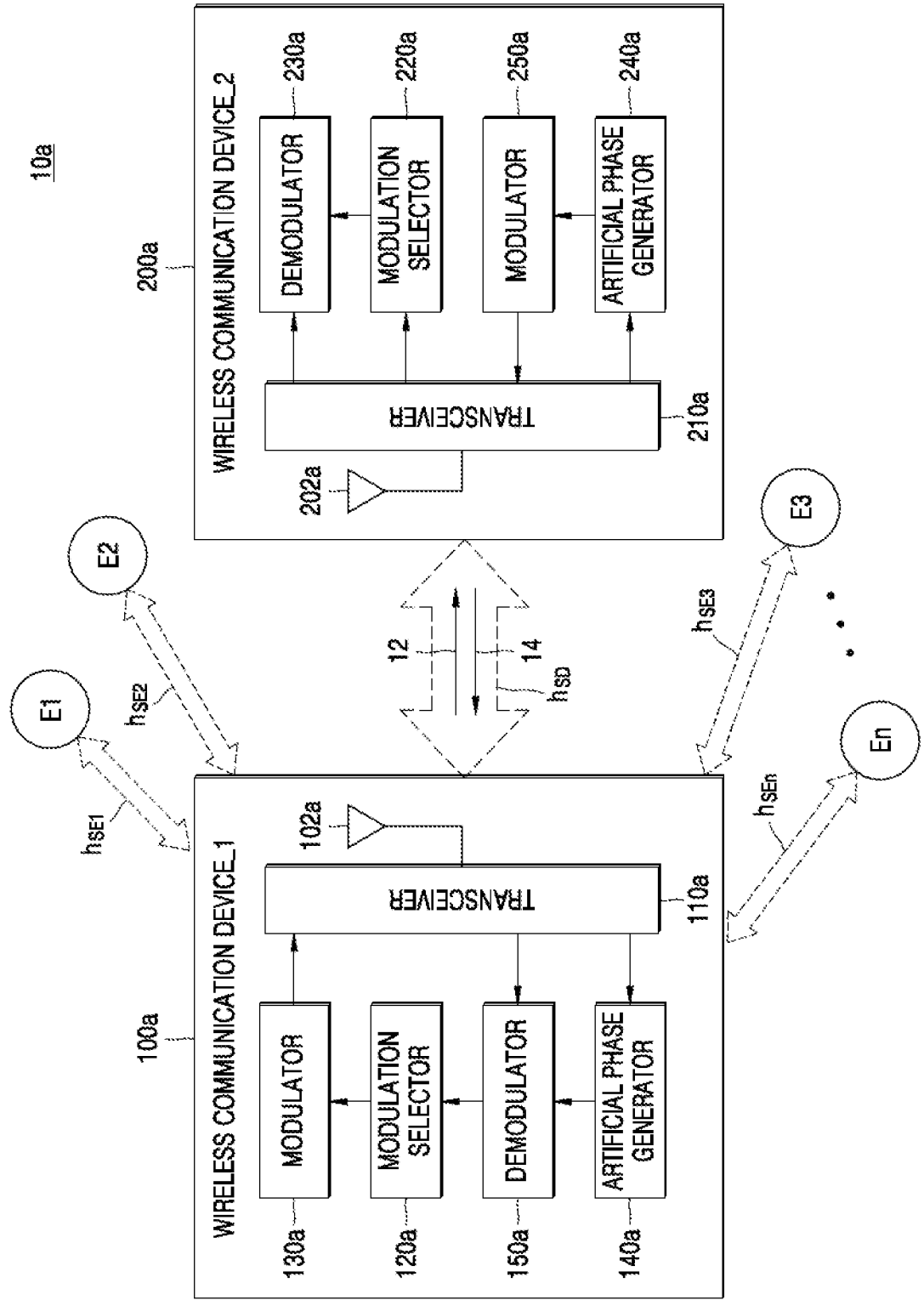
FIG. 8 is a block diagram illustrating a communication system according to an embodiment of the inventive concept.

FIG. 8 is a block diagram illustrating a communication system 10a according to an embodiment of the inventive concept. Description of the details illustrated in FIG. 8 redundantly provided above in the description with reference to FIG. 1 will be omitted.

As shown in FIG. 8, a first wireless communication device 100a may include an antenna 102a, a transceiver 110a, a modulation selector 120a, a modulator 130a, an artificial phase generator 140a, and a demodulator 150a. In addition, a second wireless communication device 200a may include an antenna 202a, a transceiver 210a, a demodulation selector 220a, a demodulator 230a, an artificial phase generator 240a, and a modulator 250a.

According to an embodiment, the artificial phase generator 140a may generate an "artificial phase" based on security association information shared between the first wireless communication device 100a and the second wireless communication device 200a. Herein, the term artificial phase refers to a phase that is not actually measured in a channel, but rather is set based on predetermined information. The artificial phase is then used to set a modulation method and/or a constellation modification of a set modulation method. For example, the first wireless communication device 100a may transmit a secure transmission request to the second wireless communication device 200a, and based on a response of the second wireless communication device 200a to this secure transmission request, the first wireless communication device 100a and the second wireless communication device 200a may share security association information. As the security association information is shared, the artificial phase generator 240a may also generate an artificial phase based on the security association information.

The second wireless communication device 200a may perform channel estimation based on a pilot signal transmitted from the first wireless communication device 100a and may modulate, via the modulator 250a, channel state information obtained through the channel estimation. According to an embodiment, the modulator 250a may perform modulation on channel state information CSI based on an artificial phase. For example, the modulator 250a may perform modulation on channel state information CSI by using the modulation method described above with reference to FIGS. 5 through 7 based on an artificial phase and transmit modulated information to the first wireless communication device 100a. The demodulator 150a included in the first wireless communication device 100a may demodulate the channel state information CSI transmitted by the second wireless communication device 200a based on the artificial phase generated by using the artificial phase generator 140a. The first wireless communication device 100a and the second wireless communication device 200a according to the inventive concept may transmit or receive the channel state information CSI that is modulated based on the artificial phase, and thus, may avoid eavesdropping attacks of the potential eavesdroppers E1 through En on the channel state information CSI. Accordingly, wireless communication security between the first wireless communication device 100a and the second wireless communication device 200a may be further reinforced.

In an alternative embodiment, the artificial phase is used just for modifying a constellation in a modulation method that is set based on channel amplitude information, without any consideration of a channel phase measurement.

Figure 9:
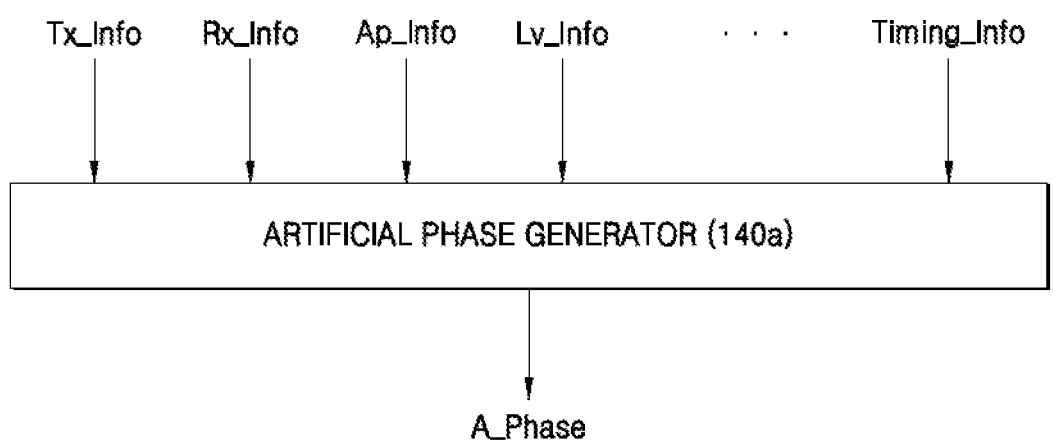
FIG. 9 is a view for describing generation of an artificial phase according to an embodiment of the inventive concept.

FIG. 9 is a view for describing generation of an artificial phase according to an embodiment of the inventive concept.

Referring to FIG. 9, the artificial phase generator 140a may generate an artificial phase A_phase based on items of security association information. According to an embodiment, the items of security association information may include at least one of user information Tx_Info of a first wireless communication device, user information Rx_Info of a second wireless communication device, security transmission application information Ap_Info, security level information Lv_Info, and timing information Timing_Info that may be used in secure transmission.

According to an embodiment, the artificial phase generator 140a may generate an artificial phase A_phase based on a preset table and pieces of security association information. For example, the artificial phase generator 140a may generate an artificial phase A_phase by searching a table for an artificial phase. A_phase corresponding to received pieces of security association information.

According to another embodiment, the artificial phase generator 140a may generate an artificial phase A_phase based on a hash function and pieces of security association information. For example, the artificial phase generator 140a may also extract an artificial phase A_phase by applying the received pieces of security association information to a hash function.

Figure 10:
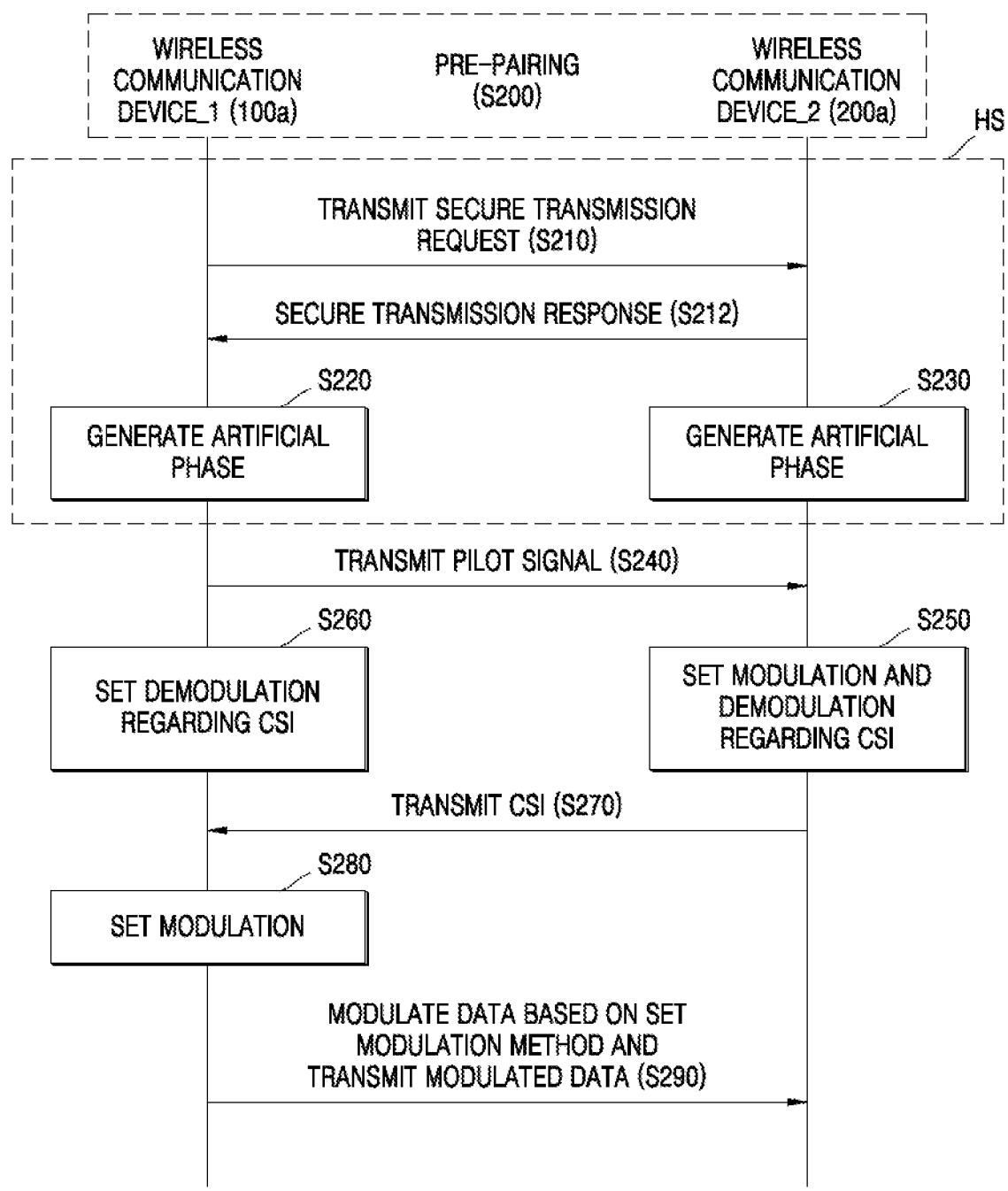
FIG. 10 is a flow diagram showing an operation of a communication system according to an embodiment of the inventive concept.

FIG. 10 is a flow diagram showing an operation of a communication system according to an embodiment of the inventive concept. FIG. 10 may be a flow diagram of, e.g., an operation of the communication system 10a of FIG. 8.

As shown in FIG. 10, the first wireless communication device 100a and the second wireless communication device 200a may be pre-paired (S200). In this operation, the first and second wireless communication devices 100a, 200a may recognize that they are interconnected. Pre-pairing may be implemented in various forms of wireless communication.

Next, the first wireless communication device 100a may transmit a secure transmission request to the second wireless communication device 200a (S210), and the second device 200a may transmit a secure transmission response to the secure transmission request to the first device 100a (S212). As the second device 200a transmits a secure transmission response, the first device 100a and the second device 200a may share items of security association information.

Next, the first device 100a and the second device 200a may generate an artificial phase based on items of security association information that they share with each other (S220, S230). The second device 200a may generate an artificial phase to be used in selecting a modulation method for modulation of channel state information CSI. Likewise, the second device 200a may generate an artificial phase to be used in selecting a demodulation method for demodulation of the received channel state information CSI. Operations S210, S212, S220, and S230 described above may be referred to as handshaking HS between the first wireless communication device 100a and the second wireless communication device 200a.

Next, the first device 100a may transmit a pilot signal to the second device 200a (S240). The second device 200a may estimate a channel based on the pilot signal and obtain channel state information CSI. The second device 200a may set a modulation method with respect to the channel state information CSI based on the artificial phase, and may set a corresponding demodulation method for receiving subsequent data transmitted by device 100a (S250). In addition, the first device 100a may set a demodulation method for demodulation of the channel state information CSI based on the artificial phase (S260). The second device 200a may transmit the channel state information CSI modulated based on the set modulation method to the first wireless communication device 100a (S270). The channel state information CSI may include information of a channel amplitude $|h_{SD}(t)|$ and information of a channel phase $\theta_{SD}(t)$. The first device 100a may demodulate channel state information CSI based on the set demodulation method, and may thus obtain the information of the channel amplitude $|h_{SD}(t)|$ and the information of the channel phase $\theta_{SD}(t)$.

The first device 100a may set a modulation method for data transmission based on the information of the channel amplitude $|h_{SD}(t)|$ and the information of the channel phase $\theta_{SD}(t)$ (S280). The first device 100a may modulate data based on the set modulation method and transmit modulated data to the second device 200a (S290).

In an alternative embodiment, the artificial phase is not used for setting a modulation method for the CSI transmitted by the second device 200a. Instead, the second device 200a just sets a demodulation method based on measured channel amplitude information of the CSI, and the artificial phase is used later to modify a constellation of the demodulation method, by rotating the constellation for demodulation by the artificial phase, in a manner akin to that illustrated in FIG. 7. In this case, CSI information measured by the second device 200a may be transmitted back to the first device 100a in a conventional manner, without regard to the artificial phase.

Figure 11:
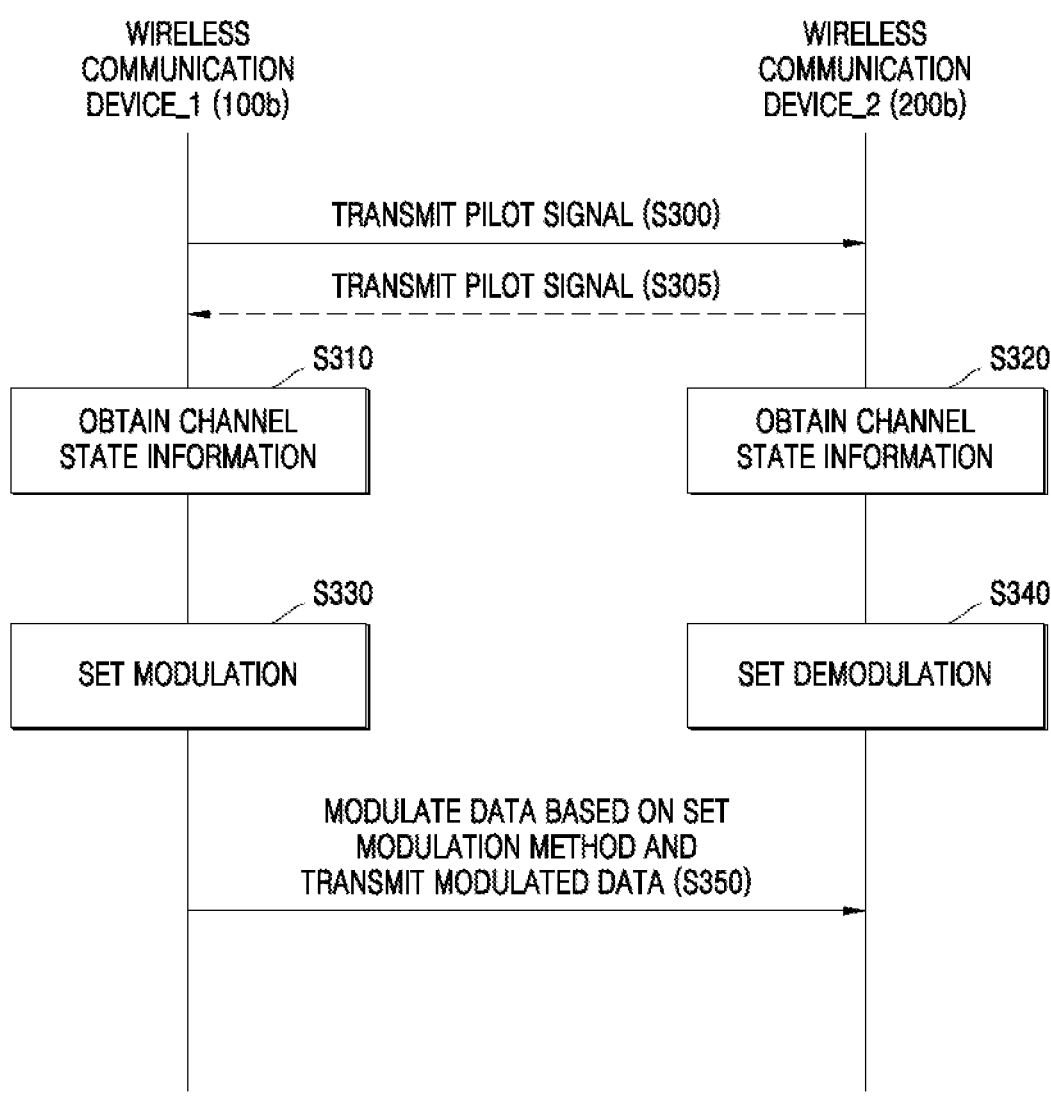
FIG. 11 is a flow diagram showing an operation of a communication system according to another embodiment of the inventive concept.

FIG. 11 is a flowchart showing an operation of a communication system according to another embodiment of the inventive concept. Description of details of the embodiment of FIG. 11 already described with reference to FIG. 2 will be omitted.

Referring to FIG. 11, a first wireless communication device 100b may transmit a pilot signal (S300). A second wireless communication device 200b may estimate channel information of a channel for wireless communication with respect to the first wireless communication device 100b based on the pilot signal, and thus may obtain information about the channel (S320). The estimated channel information may be a channel amplitude and a channel phase. In addition, the first wireless communication device 100b may estimate a channel for wireless communication according to transmission of the pilot signal, and thus may obtain information about the channel. For example, the first wireless communication device 100b and the second wireless communication device 200b may perform wireless communication based on a time division duplex (TDD) method, and thus the first wireless communication device 100b and the second wireless communication device 200b may respectively estimate the channel information by using channel reciprocity of wireless channels. Accordingly, even when the second wireless communication device 200b does not transmit additional channel state information or the like, the first wireless communication device 100b may obtain channel state information. In an example, the second device 200b also generates a second pilot signal (S305) and the first device 100b estimates the channel information based on the second pilot signal. Due to reciprocity, the channel amplitude estimated by each of the first device 100b and the second device 200b are the same; and the channel phase estimated by the first device 100b and the second device 200b are the same. Further, only the first device 100b and the second device 200b know the channel information, but an eavesdropper cannot obtain it, since the channel information is independently determined by devices 100b, 200b and is not transmitted.

Accordingly, the first wireless communication device 100b may obtain information of a channel amplitude $|h_{SD}(t)|$ and information of a channel phase $\theta_{SD}(t)$ via the channel state information and set a modulation method for data transmission based on the information of the channel amplitude $|h_{SD}(t)|$ and the information of the channel phase $\theta_{SD}(t)$ (S330). The second wireless communication device 200b may also obtain information of a channel amplitude $|h_{SD}(t)|$ and information of a channel phase $\theta_{SD}(t)$ via the channel state information and set a demodulation method for data transmission based on the information of the channel amplitude $|h_{SD}(t)|$ and the information of the channel phase $\theta_{SD}(t)$ (S340). The first wireless communication device 100b may modulate data based on the set modulation method and transmit the modulated data to the second wireless communication device 200b (S350). The data modulation and demodulation may include the constellation rotation based on the channel phase, as described above for FIG. 7.

Figure 12:
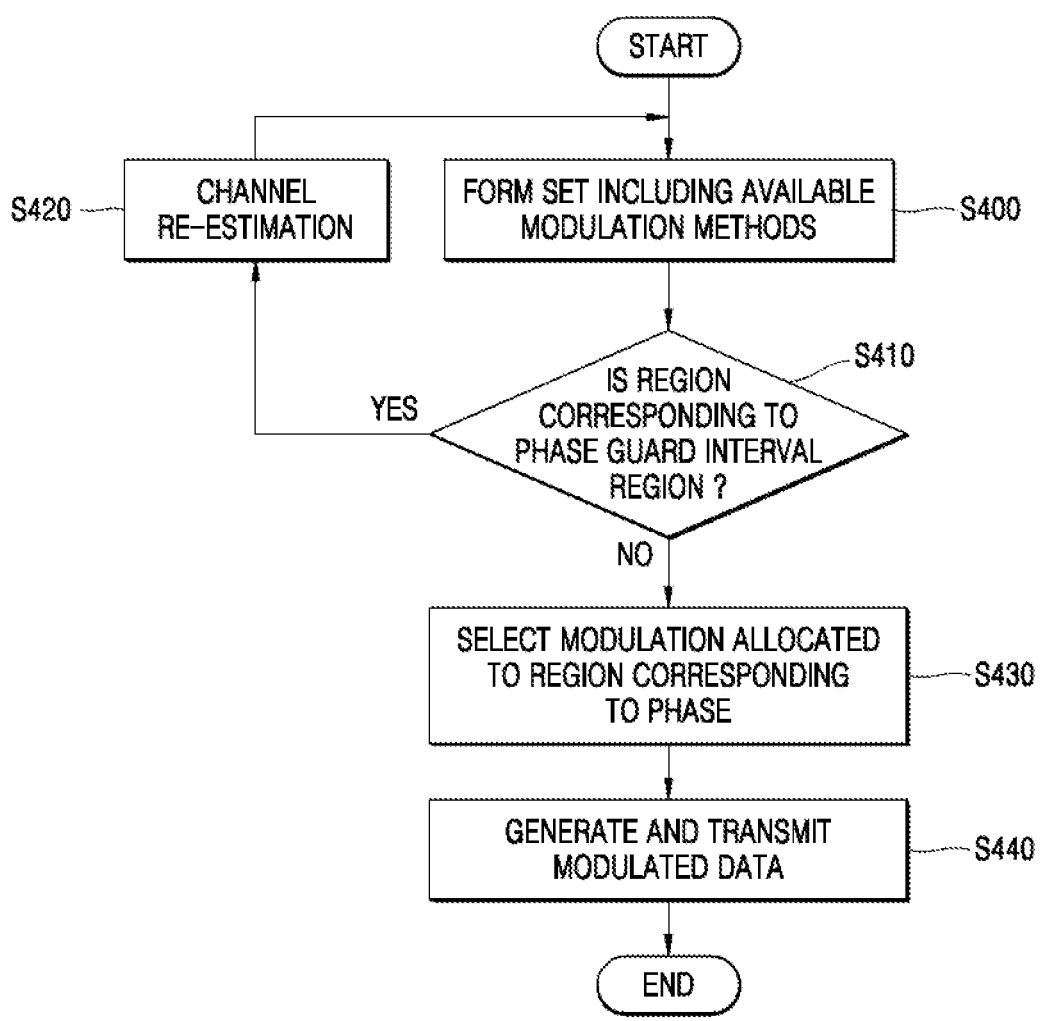
FIG. 12 is a flowchart of an operation of a first wireless communication device according to an embodiment of the inventive concept.

FIG. 12 is a flowchart of an operation of a first wireless communication device according to an embodiment of the inventive concept. FIG. 12 may be a flowchart of, e.g., operation of the first wireless communication device 100b of FIG. 11.

Referring to FIG. 12, the first wireless communication device 100b may form a set including modulation methods that are available corresponding to a channel amplitude $|h_{SD}(t)|$ from among a plurality of previously provided modulation methods (S400). For example, after forming a set $M_k$ expressed by [Equation 3] above, the first wireless communication device 100b may divide a virtual circle into k regions and respectively allocate $m_1, m_2, m_3, \ldots, m_k$ to the k regions. According to an embodiment, the first wireless communication device 100b may allocate a guard interval region between at least two regions from among the k regions divided in the virtual circle.

Figure 13:
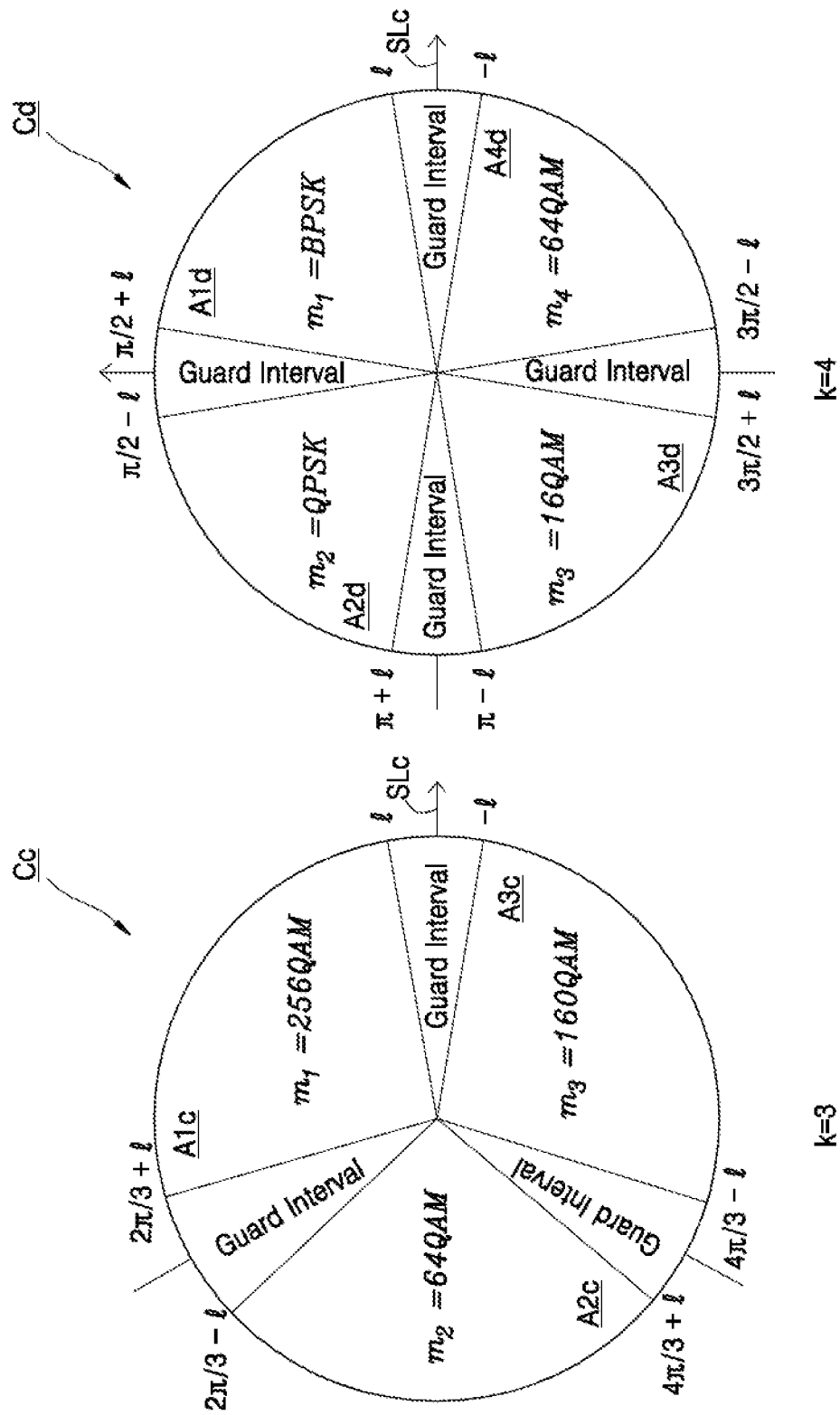
FIG. 13 illustrates a guard interval allocated to each of virtual circles.

FIG. 13 illustrates a guard interval allocated to each of virtual circles. Referring further to FIG. 13, when k is 3, a virtual circle Cc may include first through third regions A1c through A3c and a plurality of guard interval regions. For example, a guard interval region may be provided between the first region A1c and the second region A2c, between the second region A2c and the third region A3c, and between the third region A3c and the first region A1c. When k is 4, a virtual circle Cd may include four regions A1d through A4d and a plurality of guard interval regions.

For example, as the first wireless communication device 100b and the second wireless communication device 200b respectively obtain channel information by using channel reciprocity, according to circumstances, an error may occur in channel phases respectively obtained by the first wireless communication device 100b and the second wireless communication device 200b. According to the present embodiment, as a guard interval region is provided between regions, the first wireless communication device 100b and the second wireless communication device 200b may be prevented from selecting and performing different modulation and demodulation methods based on the error in the channel phase.

Referring back to FIG. 12, the first wireless communication device 100b may determine whether a region corresponding to a channel phase $\theta_{SD}(t)$ is a guard interval region (S410). For example, the first wireless communication device 100b may determine whether a region including a phase $\theta_{SD}(t)$ that is measured from a reference line SLc or SLd is a guard interval region.

When a region corresponding to the channel phase $\theta_{SD}(t)$ is a guard interval region, the first wireless communication device 100b may perform a channel re-estimation operation (S420). For example, the first wireless communication device 100b may exchange phase information of a channel with the second wireless communication device 200b via the channel re-estimation operation.

When a region corresponding to the channel phase $\theta_{SD}(t)$ is not a guard interval region, the first wireless communication device 100b may select a modulation method allocated to a region corresponding to a phase (S430). The first wireless communication device 100b may generate modulated data based on the selected modulation method and transmit the modulated data to the second wireless communication device 200b (S440).

Figure 14:
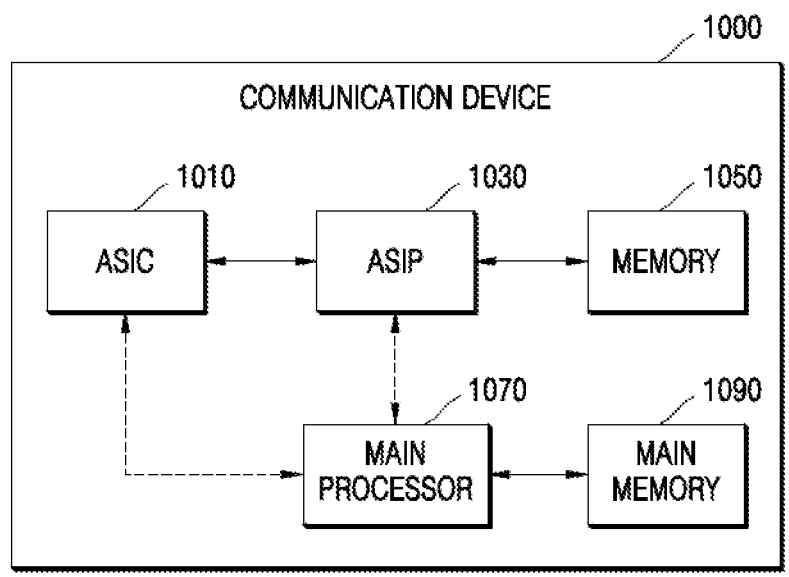
FIG. 14 is a block diagram of a wireless communication device according to an embodiment of the inventive concept.

FIG. 14 is a block diagram of a wireless communication device 1000 according to an embodiment of the inventive concept.

Referring to FIG. 14, the wireless communication device 1000 may include an Application Specific Integrated Circuit (ASIC) 1010, an Application Specific Instruction set Processor (ASIP) 1030, a memory 1050, a main processor 1070, and a main memory 1090. At least two of the ASIC 1010, the ASIP 1030, and the main processor 1070 may communicate with each other. In addition, at least two of the ASIC 1010, the ASIP 1030, the memory 1050, the main processor 1070, and the main memory 1090 may be embedded in a chip. ASIC 1010, ASIP 1030 and main processor 1070 are each a respective example of a processing circuit.

The ASIP 1030 may be a customized integrated circuit for a specific purpose, support an exclusive instruction set for a certain application, and execute instructions included in an instruction set. The memory 1050 may communicate with the ASIP 1030, and may be a non-transitory storage device and store a plurality of instructions executed by the ASIP 1030. For example, the memory 1050 may include, without limitation, any type of memory accessible by the ASIP 1030, such as random access memory (RAM), read only memory (ROM), tape, a magnetic disc, an optical disk, a volatile memory, a nonvolatile memory, and a combination thereof.

The main processor 1070 may control the wireless communication device 1000 by executing a plurality of instructions. For example, the main processor 1070 may control the ASIC 1010 and the ASIP 1030, or may process data received via a MIMO channel or a user input regarding the wireless communication device 1000. The main memory 1090 may communicate with the main processor 1070, and may be a non-transitory storage device and store a plurality of instructions executed by the main processor 1070.

Components of the wireless communication device according to the embodiments of the inventive concept described above (for example, the first wireless communication device 100 (or the second wireless communication device 200) of FIG. 1, the first wireless communication device 100a (or the second wireless communication device 200a) of FIG. 8, and the first wireless communication device 100b (or the second wireless communication device 200b) of FIG. 11 may be included in at least one component included in the wireless communication device 1000. For example, at least one of, or each of, the modulation selector ("modulation selector circuit") 120 or 120a, the modulator 130 or 130a, the artificial phase generator ("artificial phase generator circuit") 140a or 240a, the demodulator 230 or 230a of FIGS. 1 and 8, and the demodulation selector ("demodulation selector circuit") 220 or 220a may be implemented as processing circuits of at least one processor (e.g., ASIC 1010, ASIP 1030 and/or main processor 1070) via executing a plurality of instructions stored in the memory 1050.

While the inventive concept has been particularly shown and described with reference to embodiments thereof, it will be understood that various changes in form and details may be made therein without departing from the spirit and scope of the claims.

What is claimed is:

1. An operating method of a first wireless communication device, the operating method comprising:
    transmitting a pilot signal to a second wireless communication device via a wireless channel;
    receiving channel state information, estimated by and transmitted from the second wireless communication device in response to the pilot signal, the channel state information comprising amplitude information and phase information of the wireless channel;
    setting a modulation method for data transmission based on the amplitude information and the phase information of the wireless channel;
    modifying a constellation for the data transmission based on the phase information, and generating modulated data based on the modulation method using the modified constellation; and
    transmitting the modulated data via the wireless channel.

2. The operating method of claim 1, further comprising:
    transmitting a secure transmission request to the wireless channel;
    sharing security association information with the second wireless communication device communicating via the wireless channel, based on a response of the second wireless communication device to the secure transmission request transmitted via the wireless channel; and
    generating an artificial phase based on the security association information.

3. The operating method of claim 2, wherein the receiving of the channel state information comprises demodulating the channel state information based on the artificial phase.

4. The operating method of claim 2, wherein the security association information comprises at least one of user information of the first wireless communication device, user information of the second wireless communication device, security transmission application information, security level information, and timing information that is available during secure transmission.

5. The operating method of claim 1, wherein the setting of the modulation method comprises:
    forming a set including available k modulation methods, where k is a positive integer equal to or greater than 1, based on the amplitude information of the channel; and
    setting one of the modulation methods included in the set based on the phase information, as the modulation method for data transmission.

6. The operating method of claim 5, wherein the setting of one of the modulation methods included in the set as a modulation method for data transmission comprises:
    dividing a virtual circle into k regions and respectively allocating the k modulation methods into the k regions; and
    setting a modulation method allocated to a region corresponding to the phase information from among the k regions, as the modulation method for data transmission.

7. The operating method of claim 1, wherein a phase corresponding to the phase information is $\theta_{SD}$, and the modifying a constellation for the data transmission based on the phase information comprises multiplying each of a plurality of signal constellation points of the constellation by $e^{-j\theta_{SD}}$.

8. The operating method of claim 1, wherein the first wireless communication device and the second wireless communication device operate based on a frequency division duplex (FDD) method.

9. An operating method of a first wireless communication device, the operating method comprising:
    transmitting a pilot signal via a wireless channel and obtaining channel state information including channel amplitude information and channel phase information, by performing channel estimation based on channel reciprocity;
    forming a set including k modulation methods based on the channel amplitude information, where k is a positive integer equal to or greater than 1;
    selecting one of the modulation methods included in the set based on the channel phase information;
    generating modulated data based on the selected modulation method; and
    transmitting the modulated data via the wireless channel.

10. The operating method of claim 9, wherein the forming of a set comprises forming the set using modulation methods that are available in correspondence with the channel amplitude information.

11. The operating method of claim 9, wherein the forming of a set comprises adding a weight to some of the k modulation methods,
    wherein the selecting of one of the modulation methods included in the set comprises selecting one of the modulation methods included in the set further based on the weight.

12. The operating method of claim 9, wherein the selecting of one of the modulation methods included in the set comprises:
    dividing a virtual circle into k regions and respectively allocating the k modulation methods to the k regions; and
    selecting a modulation method allocated to a region corresponding to the channel phase information from among the k regions.

13. The operating method of claim 12, wherein the respectively allocating the k modulation methods to the k regions further comprises allocating a guard interval region between at least two regions from among the k regions.

14. The operating method of claim 13, wherein the selecting a modulation method allocated to a region corresponding to the channel phase information further comprises performing the channel estimation again, when the region corresponding to the channel phase information is the guard interval region.

15. The operating method of claim 13, wherein the selecting a modulation method allocated to a region corresponding to the channel phase information comprises:

exchanging, when the region corresponding to the channel phase information is the guard interval region, information about the phase of the channel with a second wireless communication device communicating via the channel; and selecting a modulation method allocated to a region corresponding to the exchanged information about the phase of the channel from among the k regions.

16. The operating method of claim 9, wherein the generating of modulated data comprises:

modifying a constellation for generating of modulated data based on the phase of the channel; and generating the modulated data based on the modified constellation.

17. The operating method of claim 9, wherein the first wireless communication device operates based on a time division duplex (TDD) method.

18. An operating method of a second wireless communication device, the operating method comprising:

receiving a pilot signal via a wireless channel and obtaining channel state information for wireless communication with a first wireless communication device based on the pilot signal;

forming a set including at least one predetermined demodulation method of a plurality of predetermined demodulation methods based on amplitude information of a channel included in the channel state information;

selecting one of the at least one predetermined demodulation method included in the set based on phase information of the channel included in the channel state information; and demodulating data received from the first wireless communication device based on the selected demodulation method.

19. The operating method of claim 18, further comprising:

responding to a secure transmission request received from the first wireless communication device and sharing a plurality of pieces of security association information with the first wireless communication device;

generating an artificial phase based on at least one of the plurality of pieces of security association information;

setting a modulation method based on the artificial phase;

modulating the channel state information based on the modulation method; and transmitting the modulated channel state information to the first wireless communication device.

* * * * *